United States Patent [19]

Scriminger

[11] 4,390,281
[45] * Jun. 28, 1983

[54] SLURRY GUN

[75] Inventor: William F. Scriminger, Muskogee, Okla.

[73] Assignee: Muskogee Environmental Conservation Co., Muskogee, Okla.

[*] Notice: The portion of the term of this patent subsequent to Oct. 19, 1999, has been disclaimed.

[21] Appl. No.: 179,015

[22] Filed: Aug. 18, 1980

Related U.S. Application Data

[63] Continuation-in-part of Ser. No. 32,165, Apr. 23, 1979, Pat. No. 4,295,744.

[51] Int. Cl.³ .............................................. B28C 5/06
[52] U.S. Cl. .......................................... 366/3; 366/6; 366/31; 366/34; 366/37; 406/48; 406/191; 366/341
[58] Field of Search .................... 366/2, 3, 5, 341, 6, 366/37, 8, 10, 11, 14, 15, 16, 21, 30, 33, 34, 101, 40, 42, 51, 1, 103, 333, 337; 222/3; 406/48, 49, 93, 153, 191, 195, 196

[56] References Cited

U.S. PATENT DOCUMENTS

| | | | |
|---|---|---|---|
| 1,254,244 | 1/1918 | Leblanc | 406/153 |
| 2,176,439 | 10/1939 | Taylor et al. | 406/191 |
| 2,450,195 | 9/1948 | Grantham | 285/169 X |
| 2,533,331 | 12/1950 | Skinner | 406/75 |
| 2,834,059 | 5/1958 | Hoelzel | 406/196 |
| 3,237,805 | 3/1966 | Stogner | 366/3 |
| 3,809,436 | 5/1974 | Ciaffone | 406/48 |
| 3,819,157 | 6/1974 | Markfelt | 366/101 |

Primary Examiner—Philip R. Coe
Assistant Examiner—Joseph M. Pitko
Attorney, Agent, or Firm—Head, Johnson & Stevenson

[57] ABSTRACT

A method and apparatus for the mixing of fly ash and a wetting agent to obtain a slurry for the ultimate disposal of fly ash. The apparatus is a slurry gun having an introduction chamber, the wetting agent being introduced horizontally into the chamber under a controlled pressure while the fly ash is aerated and introduced into the top of the chamber at an acute angle with respect to the horizontal so that the fly ash is introduced downwardly and outwardly in the direction of the flow of the wetting agent and being also under a controlled pressure, the combination of aerated fly ash and wetting agent being passed through a contorted descending path to create turbulence for mixing. A second embodiment includes a vibrator operably connected to the introduction chamber for dislodging any accumulated build up of fly ash.

11 Claims, 2 Drawing Figures

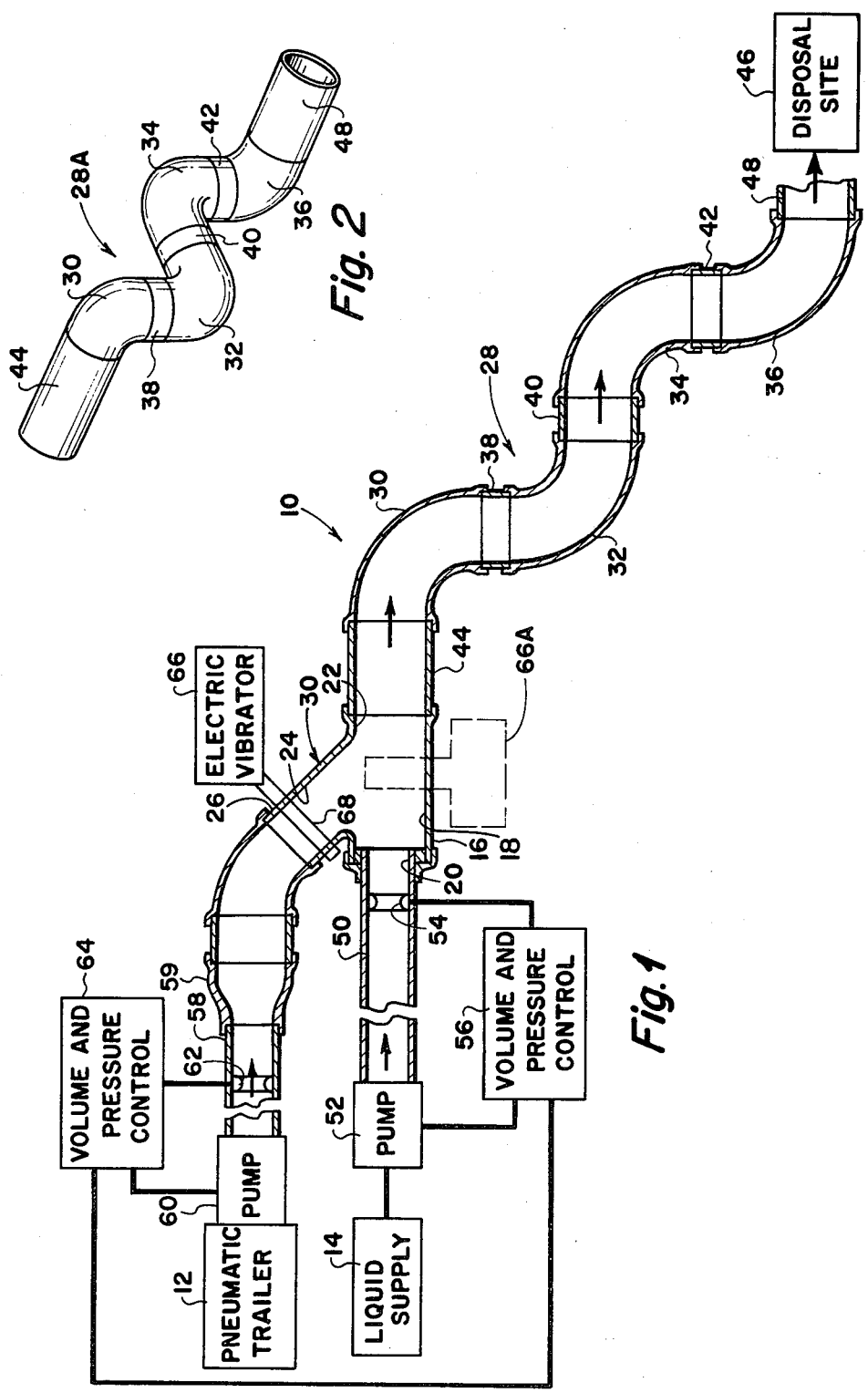

SLURRY GUN

CROSS-REFERENCE TO RELATED APPLICATION

This is a continuation-in-part of co-pending application Ser. No. 32,165, now U.S. Pat. No. 4,295,744, filed Apr. 23, 1979 by William F. Scriminger for "Slurry Gun".

BACKGROUND OF THE INVENTION

1. Field of the Invention

The present invention relates to a method and apparatus for the disposing of fly ash by mixing said fly ash with a wetting agent to form a dustless slurry.

2. History of the Prior Art

The disposal of fly ash residue from coal fired power plants, incinerators and the like has consistently been a problem over the years. This problem is growing both in quantity and complexity due to the increased usage of coal burning power plants which have come into being because of the scarcity of petroleum products and the continued opposition to the construction of nuclear power plants. Considerable attention has also been drawn to the environmental impact of disposing of fly ash. Fly ash has been typically considered a waste material incident to the burning of coal although there are many uses of the fly ash residue in the area of manufacturing fertilizer materials and as an additive to cement products.

The fly ash is a wispy material and is typically prevented from being carried off with the exhaust gases of the furnace by the use of fly ash collection means such as electrostatic precipitators or bag houses. Fixed containers or silos for holding the fly ash are usually constructed in the proximity of the coal burning furnaces for holding the fly ash until it can be disposed of.

In order to handle this wispy material often times it is removed and mixed with a wetting solution to form a slurry and this slurry is then pumped into molds for hardening or into slurry disposal ponds. Minimal water is required to produce a slurry which sets up without surplus water when the disposal site's ecological considerations require no surplus water such as underground disposal. However, other wetting agents, such as acids, may be utilized to produce approximately the same effect, however, when the acid is mixed with the fly ash, which is high in mineral oxides, a reaction typically takes place which tends to neutralize the acids, hence, often solving two problems at the same time, namely, the disposal of waste acids and the disposal of fly ash.

One inherent problem in producing a slurry is that if a slurry is mixed too wet, some particles will become suspended in the slurry rather than forming a part of the hardened cake, and upon drying will reproduce an ash that can escape into the atmosphere and become an atmospheric pollutant.

On the other hand, if the slurry is mixed too dry, some of the wispy particles may escape creating a dust atmosphere, which, again, is an atmospheric pollutant. Another problem in mixing the slurry too dry is that of caking in the mixture in disposal pipes which ultimately clogs the pipe requiring complete cleaning thereof.

In summary, the fly ash must be constantly removed from the furnaces and must be handled very carefully lest it become an atmospheric pollutant.

SUMMARY OF THE PRESENT INVENTION

The present invention provides a method and means for removing fly ash from containers, mixing the fly ash with a wetting solution to form a slurry whereby the slurry can be pumped into molds or holding ponds and hardened into cement-like ingots or cakes for either further handling or permanent disposal.

The apparatus for effecting the disposal of the fly ash is a slurry gun comprising an elongated horizontally disposed housing to form an introduction chamber. The housing may consist of a pipe section which is open at both ends and has a horizontally disposed wetting solution input port at one end whereby a wetting solution such as water, waste acids and the like, may be injected into the introduction chamber under pressure and at a controlled volume.

Fly ash is then pumped from a holding container such as a pneumatic trailer in an aerated state and also injected into the top of the housing at an angle of approximately 45° from that of the wetting solution inlet port so that the fly ash suspended in air is pumped into the introduction chamber downwardly and directed in a downstream direction within the introduction chamber.

Applicant, in its parent application, directed aerated fly ash downwardly into the introduction chamber, which, although providing some increased initial mixing, caused an undesirable back pressure sometimes causing the introduction chamber to become caked or clogged with partially wetted fly ash.

The present invention on the other hand, by introducing the fly ash inward at an angle served to relieve back pressure and also allow the aerated fly ash pressure to be maintained at a lower amount compared to the inlet water pressure while still not experiencing any blowback of fly ash back up the water line.

The output of the introduction chamber is horizontally piped into a mixing apparatus which comprises a plurality of consecutively connected elbow pipe sections which causes the mixture to follow a contorted descending path thereby creating turbulence to effect total mixing of fly ash with the wetting solution.

Applicant has found that four such elbow sections will provide sufficient mixing for practically any fly ash/wetting solution combination.

However, initial testing indicates that it is desirable for the elbow sections to be closely positioned to prevent any laminar flow of the fluid or of the liquid slurry through this mixing area. Also it has been found to be undesirable for any of the elbow sections to cause the fluid to rise in elevation which would induce caking and clogging at that point.

Further, Applicant has found under certain conditions of pressure and volume and in order to use less wetting agent, it is desirable to connect an electrically operated mechanical vibrator to the introduction chamber housing or some part rigidly connected thereto in order to induce vibration at the point of introduction to prevent any build up of fly ash which can cause caking and clogging.

Applicant has also found, as set out in its co-pending application, that the use of a standard schedule 40 plastic sewer pipe may be used as a material for constructing the slurry gun. This material is suitable to prevent sticking of the slurry to the gun which would result in build up and eventual blockage of the slurry gun or discharge pipe. This plastic material has also been found to be suitable for many industrial waste acids.

Whereas automatic controls may be incorporated in connection with the slurry gun to control volume and pressure of both aerated fly ash and water or wetting agent, it has been found in actual use that these volumes and pressures may be controlled by manually-operated suitable water pump and valves for the liquids and separate air pumps and valves for the aerated fly ash. Therefore, the invention can be practiced without the use of elaborate volume, pressure and control mechanisms with electronic feed-back systems as shown in the drawings.

DESCRIPTION OF THE DRAWINGS

Other and further advantageous features of the present invention will hereinafter more fully appear in connection with a detailed description of the drawings in which:

FIG. 1 is a side elevational sectional view of the slurry gun combined with a functional block diagram depicting the fly ash disposal system.

FIG. 2 is a perspective view of an alternate embodiment of a mixing apparatus for the slurry gun of FIG. 1.

DESCRIPTION OF THE PREFERRED EMBODIMENTS

Referring to the drawings in detail, reference character 10 generally indicates a slurry gun for the intimate mixing of aerated fly ash from a fly ash holding bin, pneumatic trailer or the like depicted by reference character 12 and a wetting agent from a liquid supply reservoir or water source 14.

The slurry gun comprises a horizontally disposed cylindrical housing 16 which is open at both ends and which forms a material introduction chamber 18. A wetting agent or water inlet port 20 is horizontally disposed and connected to one end of the housing 16 in coaxial alignment therewith. The opposite end of the housing 16 is provided with an outlet port 22 which is at least as large in cross-sectional area as the introduction chamber 18.

An aerated fly ash inlet port 24 is secured to the top of the housing 16 in open communication therewith. The fly ash inlet port 24 is made up of a pipe section 26 and is disposed at an angle with respect to the liquid introduction port 20 of approximately 45°. This 45° angle is disposed in such a way that the aerated fly ash entering therein will enter downwardly and will also be directed downstream with the flow of the wetting agent entering the inlet port 20.

The slurry gun 10 further comprises a mixing apparatus indicated by reference character 28 and generally comprises a plurality of pipe elbow sections 30, 32, 34 and 36 which are closely connected by short coupling sections 38, 40 and 42, respectively. The first elbow section 30 is operably connected to the housing outlet port 22 by a relatively short pipe section 44.

The embodiment of FIG. 1 depicts the mixing apparatus 28 as lying in a vertical plane with each elbow section providing a contorted path of horizontal and vertical passageways in order to create sufficient turbulence to thoroughly mix the aerated fly ash and wetting agent to form a fly ash slurry which is then piped to a disposal site 46 which may be a holding pond or suitable molds for either further handling or permanent disposal. This disposal piping is accomplished by a suitable pipe section 48.

The wetting agent inlet port is operably connected to the liquid supply 14 through suitable piping 50 which is connected between the inlet port 20 and the output of a pump 52. A variable orifice restriction valve 54 may be disposed within the pipe 50 and both the pump 52 and the valve 54 may be controlled by a suitable volume and pressure control apparatus 56 which may be either carried by the slurry gun itself or may be carried by fixed equipment for simple attachment to the slurry gun.

The fly ash inlet pipe 26 is operably connected to the aerated fly ash source through suitable piping 58 which is connected between the fly ash inlet port and a pneumatic pump 60. A suitable variable restriction orifice 62 may be carried within the pipe 58 and both the pneumatic pump 60 and the restriction orifice 62 may be controlled by a volume and pressure control unit 64.

The volume and pressure control units 56 and 64 for both the wetting agent and the aerated fly ash may be operably connected to provide automatic controls for the relative pressures and volumes of the materials to form the fly ash slurry.

It is rather critical to control the volume and pressure of both the wetting agent and the aerated fly ash relative to each other in order to provide the proper slurry mixture. For example, if the slurry is mixed too wet, fly ash particles may be suspended in the liquid and not harden into the cake after the slurry is allowed to dry thereby leaving finely divided ash particles free to be taken into the atmosphere creating a pollutant.

On the other hand, if the slurry is too dry, part of the ash particles will be suspended in cakes or may never go into a hardened form, which creates a fly ash dust environment which, again, is an atmospheric pollutant.

The relative pressures in which the materials enter the introduction chamber 18 is important for two reasons. The first is that sufficient movement through the piping is required in order to create the necessary turbulence for intimate mixing of the fly ash with the wetting agent and for moving the slurry to the disposal site without the need for additional pumps. The second reason for accurately controlling the relative pressures is to insure that the liquid pressure exceeds that of the aerated fly ash pressure to prevent blow-back of the fly ash back into the liquid line 50.

It has been found to be advantageous to connect the fly ash inlet port 24 to the piping 58 by an expansion coupler 59 to aid in preventing clogging when the fly ash is not adequately suspended by the air.

Although the expander joint 59 is not considered essential, it would certainly be advantageous to insure that there is at least no reduction in size at this point.

The cross-sectional area of the passageway of the mixing apparatus 28 should be at least as large as the cross-sectional area of the housing 16 to prevent unwanted back pressure therein.

The setting of the aerated fly ash inlet port 24 at a 45° angle with respect to the horizontal serves to eliminate some of the back pressure in the material introduction chamber 18. However, under certain conditions where there might be a build-up of dry fly ash within the housing 16, an electrically-operated mechanical vibrator 66 may be secured to the aerated fly ash inlet port piping 26 by suitable straps 68 or other hard mounting which will serve to vibrate the inlet port and the housing 16 to shake loose any accumulation of particles. It is noted that vibrator 66a may be secured directly to the housing 16 as shown by the dashed lines.

Referring to FIG. 2 reference character 28A represents one of the alternate embodiments for connecting the elbow sections 30, 32, 34 and 36 in order to show that these elbow sections may provide a contorted path that extends out of the vertical plane described in connection with the drawings of FIG. 1. The same coupling members 38, 40 and 42 may be utilized for this configuration or any other particular configuration so long as the consecutive elbow sections create a path that is both contorted and descending in elevation.

Applicant has found that although it is not absolutely essential that there be four bends in the path, he has achieved relatively good success with four bends although there are occasions when only two will do the job. On the other hand, if too many bends were used, it is felt that the back pressure would possibly cause clogging within the mixing apparatus or possibly at the outlet port 22 of the housing 16.

The pipe tubing making up the slurry gun can be a source of clogging due to the material itself. Applicant has found that plastic piping such as schedule 40 sewer pipe provides very satisfactory results in preventing the wetted fly ash from sticking to the inside surfaces thereof. It is felt that this same effect might be accomplished by coating the insides of stainless steel or pipes made of other materials in order to provide an adequate inside surface.

In conjunction with the material used to make up the pipe, consideration must be given to the wetting agent since certain industrial waste acids work very well as a wetting agent and serve to not only provide a method and means for disposing of the fly ash but also provides for the disposal of unwanted industrial waste acids.

From the foregoing it is apparent that the present invention provides an improved slurry gun for the intimate mixing of fly ash and a wetting agent wherein the wetting agent is introduced horizontally into an introduction chamber and the fly ash is introduced at an acute angle with respect thereto in order to reduce back pressure in the material introduction chamber. A mechanical vibrator may be connected to the material introduction chamber to assist in dislodging any build up or clogging at the fly ash inlet port or within the chamber itself.

Whereas the present invention has been described in particular relation to the drawings attached hereto, other and further modifications apart from those shown or suggested herein may be made within the spirit and scope of the invention.

What is claimed is:

1. A slurry gun for the mixing of aerated fly ash and a wetting agent comprising
   (a) an elongated horizontal housing disposed in a vertical plane, open at both ends to create a material introduction chamber;
   (b) a horizontal wetting agent inlet port in the vertical plane of said housing communicating with a first open end of said housing for the horizontal longitudinal introduction of a wetting agent into the housing under pressure;
   (c) an aerated fly ash inlet port disposed in the vertical plane of said housing and connected to the top of the housing in communication with the interior of the housing intermediate the ends thereof, said fly ash inlet port being disposed at an acute angle with respect to the wetting agent inlet port for the introduction of aerated fly ash therein under pressure; and
   (d) a mixing apparatus operably secured to the second end of said horizontally disposed housing and comprising a contorted passageway having a plurality of closely connected right angle bends providing portions extending in vertical planes within and parallel said vertical plane of said housing and portions extending perpendicularly to said vertical plane of said housing in at least one horizontal plane for creating a turbulent descending path for the material; and
   (e) a slurry outlet port disposed at a lower elevation than that of the housing and of the contorted passageway.

2. A slurry gun as set forth in claim 1 and including vibrator means operably connected to the housing for inducing mechanical vibration to the housing and associated inlet ports to dislodge any accumulation of fly ash.

3. A slurry gun as set forth in claim 1 and including vibrator means operably connected to the aerated fly ash inlet port of the housing for inducing mechanical vibration to the inlet port and the housing to dislodge any accumulation of fly ash therein.

4. A slurry gun as set forth in claim 1 wherein the acute angle between the wetting agent inlet port and the aerated fly ash inlet port is substantially 45°.

5. A slurry gun as set forth in claim 1 wherein the cross-sectional area of the contorted passageway is at least as large as the cross-sectional area of the introduction chamber housing.

6. A slurry gun as set forth in claim 1 wherein the plurality of substantially right angle bends comprises four such bends, the first turning downwardly, the second turning outwardly, the third downwardly and the fourth outwardly.

7. A slurry gun as set forth in claim 6 wherein the plurality of bends in the mixing apparatus lie in a vertical plane.

8. A method for mixing a slurry of fly ash and a wetting agent comprising the steps of
   (a) introducing the wetting agent horizontally into a material introduction chamber disposed in a vertical plane under pressure and at a controlled volume;
   (b) introducing aerated fly ash into the introduction chamber downwardly in said chamber vertical plane and outwardly at an acute angle with respect to the flow of wetting agent at a controlled volume of fly ash and pressure of air and
   (c) creating turbulence downstream of the introduction chamber by passing the fly ash and wetting agent through a contorted path defined by a series of right angle paths some of which are in the vertical plane of the material introduction chamber and in planes parallel such plane and some of which right angle paths are in at least one horizontal plane perpendicular the vertical plane of the material introduction chamber for thoroughly mixing the fly ash and the wetting agent into a slurry.

9. A method as set forth in claim 8 and including the control of wetting agent pressure above that of the incoming aerated fly ash pressure for preventing blowback of fly ash into the wetting agent flow.

10. A method as set forth in claim 8 and including the step of intermittently vibrating the introduction chamber.

11. A method as set forth in claim 8 and including the step of continuously vibrating the introduction chamber.

* * * * *